Dec. 17, 1935.　　　J. J. NEUMANN　　　2,024,777
CUSHIONED UNIVERSAL JOINT
Filed Feb. 25, 1935
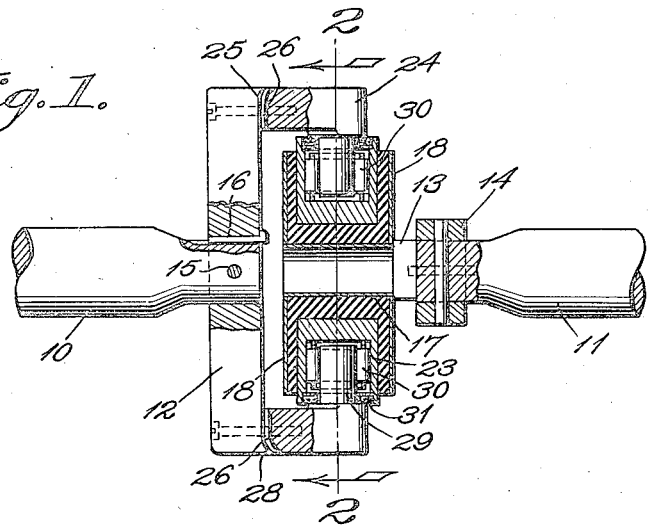
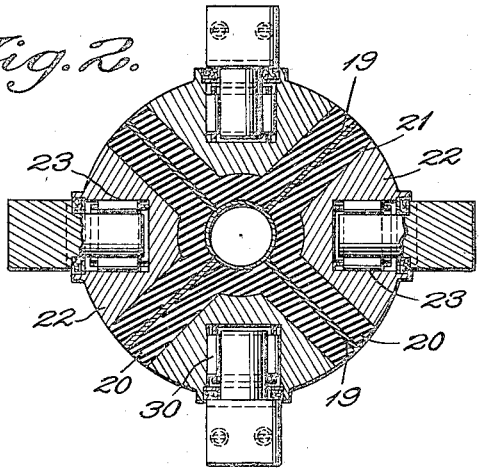
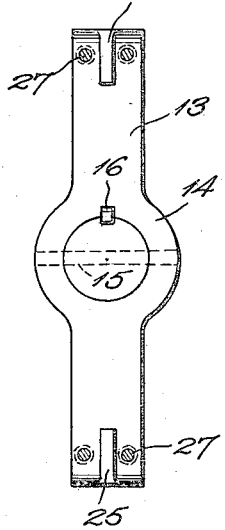
John J. Neumann
INVENTOR
BY Victor J. Evans & Co.
ATTORNEY
R. E. Wise.
WITNESS Patented Dec. 17, 1935

2,024,777

UNITED STATES PATENT OFFICE 2,024,777

CUSHIONED UNIVERSAL JOINT

John J. Neumann, Omaha, Nebr.

Application February 25, 1935, Serial No. 8,117

3 Claims. (Cl. 64—17)

The invention relates to a universal joint and more particularly to a cushioned universal joint.

The primary object of the invention is the provision of a joint of this character, wherein the same will absorb shocks and jars when arranged in an automobile as may be set up between the differential, transmission and clutch mechanisms and thereby minimizing wear on the driving and driven parts as result from sudden strains and jerks and also breakage therein.

Another object of the invention is a joint of this character, wherein the same functions as a noise silencer and also functions as a shock absorber between driving and driven parts, it being effective as a cushioning medium at the point of the juncture between the driving and driven parts, the joint being novel in construction in its entirety.

A further object of the invention is the provision of a joint of this character, which is comparatively simple in construction, thoroughly reliable and efficient in its operation, readily and easily assembled and disassembled, strong, durable, capable of uniform action, and inexpensive to manufacture and install.

With these and other objects in view the invention consists in the features of construction, combination and arrangement of parts as will be hereinafter fully described, illustrated in the accompanying drawing and pointed out in the claims hereunto appended.

In the accompanying drawing:

Figure 1 is a fragmentary side elevation of driving and driven parts showing the universal joint constructed in accordance with the invention therebetween, the joint being partly in section.

Figure 2 is a sectional view on the line 2—2 of Figure 1 looking in the direction of the arrows.

Figure 3 is an elevation looking toward the inner face of one of the spider members of the universal joint.

Similar reference characters indicate corresponding parts throughout the several views in the drawing.

Referring to the drawing in detail, 10 and 11 designate generally portions of driving and driven shafts, respectively, as for example, arranged in motor driven vehicles between the transmission and differential mechanisms, not shown. Connecting the driving and driven shafts 10 and 11 is the universal joint constituting the present invention and hereinafter fully described.

The universal joint comprises a pair of double armed spiders 12 and 13, respectively, these being arranged at right angles to each other and are formed with central hubs 14 for fitting with the shafts 10 and 11. The spider 12 is fitted with the shaft 10 and the spider 13 is fitted with the shaft 11 and are locked thereto by a cross pin 15 and keys 16, the latter affording splined connection, while the pins 15 are the cross connectors between said shafts and spiders.

Centered between the shafts 10 and 11 and the spiders 12 and 13 is the wheel casting including a tubular center hub 17 having integral at its ends disks 18 which are spaced from each other the extent of the hub 17, while disposed radially between the disks 18 and meeting the said hub 17 are diametrically opposed partitions or webs 19 to provide segmental shaped pockets therebetween for accommodating correspondingly shaped cushioning sectors 20. Each sector 20 is made from rubber and is provided with a segmental shaped socket 21 for receiving a correspondingly shaped shoe 22 having a central circular pivot recess 23.

Carried by the spiders 12 and 13 at their outer ends are pivoted blocks 24 each having tongue 25 and groove 26 interfit with its companion spider and made fast thereto by fasteners 27. The spider at the tongue and groove interfit of the blocks 24 therewith carries curved lips 28 overhanging said block to avoid outward spreading of the latter on the fastening of the said blocks to the spider. The blocks 24 are formed with pivot pins or lugs 29, these being journaled in the recesses 23 and are surrounded by caged bearing rollers 30 fitting said recesses 23. About the pins or lugs are lubricant retaining washers 31 which cap the recesses 23 and afford dust proof coverings for the said bearings within the recess.

It should be obvious from Figures 1 and 2 of the drawing that a universal joint operation is had between the shafts 10 and 11 and that this joint as hereinbefore described will function as a shock absorber and as a noise silencer in the use thereof between the driving and driven shafts 10 and 11.

As has been stated, the sectors 20 are made from rubber and the shoes 22 fitting these sectors are made from metal, there being a cushioning action as set up by the sectors 20 for the shoes 22 under universal action of the joint, particularly when one shaft is out of alignment with the other in the use of the universal joint.

What is claimed is:

1. A universal joint comprising crossed spiders for connection centrally thereof with driving and driven parts, a wheel like casting between the driving and driven parts and said spiders and having opposed sector shaped pockets, resilient cushioning sectors in said sockets and pivot blocks carried by the spiders at their ends and having pivots connecting the same with said cushioning sectors.

2. A universal joint comprising crossed spiders for connection centrally thereof with driving and driven parts, a wheel like casting between the driving and driven parts and said spiders and having opposed sector shaped pockets, resilient cushioning sectors in said sockets, pivot blocks carried by the spiders at their ends and having pivots connecting the same with said cushioning sectors and means detachably keying the pivot blocks to the spiders.

3. A universal joint of the character described comprising crossed double armed spiders for connection with driving and driven parts, a wheel like casting having sector shaped pockets therein, pocketed cushioning sectors fitting the pockets in said casting, sector shaped shoes fitting the pockets in the cushioning sectors and having pivot sockets, pivot blocks carried by the spiders and having pivots in said sockets, and anti-friction means about said pivots and between the latter and the walls of said sockets.

JOHN J. NEUMANN.